United States Patent
Garchery et al.

(10) Patent No.: US 12,058,158 B2
(45) Date of Patent: Aug. 6, 2024

(54) METHOD FOR INTRUSION DETECTION TO DETECT MALICIOUS INSIDER THREAT ACTIVITIES AND SYSTEM FOR INTRUSION DETECTION

(71) Applicant: BULL SAS, Les Clayes-sous-Bois (FR)

(72) Inventors: Mathieu Garchery, Munich (DE); Zerhoudi Saber, Passau (DE); Michael Granitzer, Passau (DE)

(73) Assignee: BULL SAS, Les Clayes-sous-Bois (FR)

( * ) Notice: Subject to any disclaimer, the term of this patent is extended or adjusted under 35 U.S.C. 154(b) by 164 days.

(21) Appl. No.: 17/869,730

(22) Filed: Jul. 20, 2022

(65) Prior Publication Data

US 2022/0368714 A1 Nov. 17, 2022

Related U.S. Application Data (63) Continuation of application No. PCT/EP2020/060573, filed on Apr. 15, 2020.

(30) Foreign Application Priority Data

Jan. 20, 2020 (EP) .................................... 20152652

(51) Int. Cl.
*H04L 9/40* (2022.01)
*H04L 67/306* (2022.01)
*H04L 67/50* (2022.01)

(52) U.S. Cl.
CPC ........ *H04L 63/1425* (2013.01); *H04L 67/306* (2013.01); *H04L 67/535* (2022.05)

(58) Field of Classification Search
CPC .. H04L 63/1425; H04L 67/535; H04L 67/306
See application file for complete search history.

(56) References Cited

U.S. PATENT DOCUMENTS

| | | | | |
|---|---|---|---|---|
| 8,209,758 | B1 * | 6/2012 | Doukhvalov | ......... H04L 67/306 726/25 |
| 9,537,880 | B1 * | 1/2017 | Jones | .................. H04L 63/1433 |

(Continued)

FOREIGN PATENT DOCUMENTS

EP 3660719 A1 6/2020

OTHER PUBLICATIONS

International Search Report issued in PCT/EP2020/060573, dated Sep. 15, 2020 (16 pages).

(Continued)

*Primary Examiner* — Raqiul A Choudhury
(74) *Attorney, Agent, or Firm* — ARC IP Law, PC; Joseph J. Mayo (57) ABSTRACT

A method and system for intrusion detection to detect malicious insider threat activities within a network of user profiles. The method includes training a Neural Network on multiple sets of user profile data for multiple user profiles and on multiple sets of activity data of the multiple user profiles of the network, such that the Neural Network is capable of predicting for future dates activities for multiple user profiles. The method includes applying the trained Neural Network on the set of further user profile data of the further user profile, predicting an activity of the further user profile based on the multiple sets of activity data by the trained Neural Network, observing activity of the further user profile, applying the trained Neural Network on the observed activity, and detecting malicious activity for the further user profile by the trained Neural Network, if the observed activity deviates from the predicted activity.

11 Claims, 2 Drawing Sheets

(56) References Cited

U.S. PATENT DOCUMENTS

| | | | | |
|---|---|---|---|---|
| 11,297,083 | B1* | 4/2022 | Kuppa | H04L 63/1458 |
| 2015/0286819 | A1* | 10/2015 | Coden | G06F 21/554 |
| | | | | 726/23 |
| 2016/0065594 | A1 | 3/2016 | Srivastava et al. | |
| 2017/0302679 | A1 | 10/2017 | Caramico | |
| 2018/0316704 | A1* | 11/2018 | Joseph Durairaj | H04L 41/142 |
| 2018/0375886 | A1 | 12/2018 | Kirti et al. | |
| 2019/0230107 | A1* | 7/2019 | De Sapio | H04L 63/145 |

OTHER PUBLICATIONS

Symantec, "The 2019 Symantec Internet Security Threat (ISTR) Report"; 2019 (61 pages).
IBM Security, "Cost of a Data Breach Report 2019"; 2019 (76 pages).
Tuor et al., "Deep Learning for Unsupervised Insider Threat Detection in Structured Cybersecurity Data Streams"; arXiv:cs.NE/1710.00811; Dec. 15, 2017 (9 pages).
Bryan et al., "DeepWalk: Online Learning of Social Representations", Proceedings of the 20th ACM SIGKDD international conference on Knowledge discovery and data mining; Jun. 27, 2014 (10 pages) (2014).
Tang, et al., "LINE: Large-scale Information Network Embedding"; WWW 2015, 2015 (11 pages).
Aditya et al.; "node2vec: Scalable Feature Learning for Networks" Proceedings 20 of the 22nd ACM SIGKDD International Conference on Knowledge Discovery and Data Mining; 2016 (10 pages).
Daixin et al., "Structural Deep Network Embedding"; 2016 ACM; 2016 (pp. 225-234).
Ribeiro, et al., "struc2vec: Learning Node Representations from Structural Identiy"; Proceedings of the 23rd ACM SIGKDD International Conference on Knowledge Discovery and Data Mining—Aug. 2017 (10 pages).

\* cited by examiner

METHOD FOR INTRUSION DETECTION TO DETECT MALICIOUS INSIDER THREAT ACTIVITIES AND SYSTEM FOR INTRUSION DETECTION

This application is a Continuation of International Application No. PCT/EP2020/060573 filed 15 Apr. 2020, which claims priority to European Patent Application Number EP20152652.2 filed 20 Jan. 2020, the specifications of which are hereby incorporated herein by reference.

BACKGROUND OF THE INVENTION

Field of the Invention

The invention relates to a method for intrusion detection to detect malicious insider threat activities. The present invention further relates to a system for intrusion detection that is configured to execute the method for intrusion detection to detect malicious insider threat activities.

Description of the Related Art

Cyber-attacks are one of the biggest risks that threatens an operational IT system and can lead to an exposure of sensitive personal and business data or even cause some serious damage. These attacks are becoming more sophisticated and hard to defend against which increases the difficulty of accurately detecting intrusions. Several intrusion detection methods have been introduced in the literature to tackle those threats, but they are unable to handle challenging scenarios in which new classes may appear after the learning stage. This application presents an improved intrusion detection framework that utilize graph embedding techniques to extract extensive context and then exploit it in detecting new threats.

Nowadays, traditional security solutions such as firewalls and intrusion detection systems do not prevent nor offer an optimal immunity against insider threat problems. This is mostly due to the fact that insider threats are performed by people working within an organization and trusted by having access and knowledge of multiple important assets. As a result, the US, India and many other countries have been impacted by the zero-day (previously unseen) attacks. The 2019 Symantec Internet Security Threat (SIST) Report showed that even if the number of zero-day attacks that were reported has declined from 27 percent in 2017 down to 23 in 2018, it still recorded more than three billion zero-day attacks. Moreover, the 2019 Data Breach Statistics Report highlighted that the number of security breach incidents is on the rise despite of the positive impact of GDPR which lead businesses to take positive steps toward improving their cyber security.

The aim of an Intrusion detection System is to identify different kinds of attacks as early as possible, which cannot be achieved by traditional security solutions. Consequently, detecting zero-day attacks has become the highest priority.

For example, Tuor et al., "Deep Learning for Unsupervised Insider Threat Detection in Structured Cybersecurity Data Streams"; arXiv:cs.NE/1710.00811 introduce user-based profiling system which aims to detect anomalies in online fashion. In their work Tuor et al. model users' normal behavior based on meta data stored in audit logs and use anomaly as an indicator of potential malicious behavior. In particular Tuor et al. use audit log data of users, that document the behavior of said users over a predetermined time period of behavioral observation. These audit log data are further used to train specific neural networks to create a pattern of normal behavior for each user. Based on this training and the respective behavioral pattern for each user a future behavior for each user can be predicted. Abnormal behavior can then be detected via discrepancies between future behavior predicted for a certain time span and the actual behavior monitored during this specific time span.

The method taught be Tuor et al. however fails in the cases that either a new user joins the company or that users change roles or positions or certain departments or teams within the company are restructured as for these cases the method cannot rely on previously obtained behavior patterns.

Thus, one objective of the current invention is to provide an improved method for intrusion detection to detect malicious insider threat activities that is capable of overcoming or mitigating the deficiencies present in the state of the art. Another objective of the current invention is to provide a system that is configured to execute the method for intrusion detection to detect malicious insider threat activities.

BRIEF SUMMARY OF THE INVENTION

The objectives are solved by one or more embodiments of the method and systems according to the independent claims. One or more embodiments of the method and system are specified in the dependent claims.

Zero-shot learning (ZSL) is known to be inspired from the way human identify new and unseen classes when a high-level description is provided. This high-level description is then used to identify new classes without any training samples by relating them to classes that we previously learned during the training. ZSL has two main stages: the Attribute Learning Stage (training phase) in which knowledge about the attributes is captured, and then the Inference Stage where this knowledge is used to classify instances among a new set of classes.

This zero-shot learning capability of identifying new classes when a high-level description is provided can be deployed in many fields especially in improving intrusion detection systems. In order to adapt zero-shot learning to Intrusion detection systems (IDS) in one or more embodiments of the invention, graph embeddings were utilized to extract user embeddings from Lightweight Directory Access Protocol LDAP attributes which characterize the user behavior in two scenarios which reflect a zero-shot learning situation in a real-world environment (an organization's infrastructure).

Typically, an IDS is tasked to protect the organization's information systems and communications network from malicious attacks and unauthorized access to sensitive information and data. However, it is also asked to deal with newly added employees, newly created projects, teams and departments, new clients and comparable changes in the structure of the company or organization. In this regard two scenarios are of intensified interest, by way of at least one embodiment. The first scenario regards the case where a new employee is added to an organization's infrastructure. The second scenario regards the changing of behavior that occurs when an existing employee changes the project he's working on or is transferred to another team or department. The two scenarios used in one or more embodiments are realistic and focus on a specific type of cases where the methods known from state of the art fail to distinguish threats and normal user behavior.

Graph embedding is a widely used technique alongside with link prediction, classification and clustering in organizational network analysis to learn low-dimensional representations for nodes in graphs. In at least one embodiment of the invention, graph embedding techniques are utilized to improve the classification of insider threat behaviors, especially in zero-shot learning situations.

Graph Embedding techniques transform nodes within a graph into low-dimensional dense vectors and position the vectors in a particular vector space, such that for nodes which are similar in the original graph (different methods have different definitions) and therefore exhibit some sort of proximity within the graph the respective vectors are also positioned within the vector space with comparable proximity.

Many approaches can be used in graph embeddings, in one or more embodiments, and are generally categorized as either community or role-based. The goal in graph-based intrusion detection is to identify an anomalous node, edge or sub-graph that do not conform to the expected behavior in the graph. Community-based embeddings are known to remain stationary over time, which allows us to raise a flag whenever a group of nodes suddenly becomes more similar to another community. While role-based embeddings help detecting anomalies which are defined with reference to the structural properties and behavior in a given network.

At least one embodiment of the invention utilizes the following embedding methods:

DeepWalk disclosed by Bryan et al. 2014; DeepWalk; Proceedings of the 20th ACM SIGKDD international conference on Knowledge discovery and data mining—KDD '14 (2014).

LINE disclosed by Jian et al. 2015; LINE: Large-scale Information Network Embedding. arXiv:cs.LG/1503.03578, Node2vec disclosed by Aditya et al. 2016; node2vec; Proceedings of the 22nd ACM SIGKDD International Conference on Knowledge Discovery and Data Mining—KDD '16 (2016).

SDNE disclosed by Daixin et al. 2016. Structural Deep Network Embedding. 1225-1234. and Struc2Vec disclosed by Leonardo et al. 2017. struc2vec. Proceedings of the 23rd ACM SIGKDD International Conference on Knowledge Discovery and Data Mining—KDD '17 (2017).

At least one embodiment of the invention regards the development and improvement of an unsupervised machine learning system which analyzes data from different sources and detect malicious insider threat activities.

According to at least one embodiment of the invention, a method for intrusion detection to detect malicious insider threat activities within a network of multiple interconnected computerized user profiles is provided, wherein each user profile is defined by a set of user profile data, wherein the user profile data of a user profile are configured to identify the respective user profile within an organization structure of the network of the multiple interconnected user profiles, wherein for each user profile multiple sets of activity data are available, wherein each set of activity data of a user profile is configured to illustrate the activity of the user profile for a particular date during a predefined time span, wherein the network further comprises a further user profile, wherein the further user profile is defined by a set of further user profile data, wherein the further user profile data of the further user profile are configured to identify the further user profile within the organization structure of the network of the multiple interconnected user profiles, and wherein for the further user profile no sets of activity data are available, and wherein the method comprises the following method steps:

Training a Neural Network on multiple sets of user profile data for multiple user profiles and on multiple sets of activity data of the multiple user profiles of the network, such that the Neural Network is capable of predicting for future dates activities for multiple user profiles, Applying the trained Neural Network on the set of further user profile data of the further user profile,—Predicting an activity of the further user profile for a future date based on the multiple sets of activity data by the trained Neural Network, Observing the activity of the further user profile at the future date Applying the trained Neural Network on the observed activity of the further user profile at the future date, and Detecting malicious activity for the further user profile at the future date by the trained Neural Network, if the observed activity of the further user profile at the future date deviates from the predicted activity of the further user profile for the future date.

This achieves the technical advantage in one or more embodiments, that a method for intrusion detection to detect malicious insider threat activities within a network of multiple interconnected computerized user profiles is provided, that is configured to detect malicious activities of at least one of the user profiles based on a comparison between actually observed activities of a user profile and expected activities of that user profile. The method of one or more embodiments of the invention is further configured to consider user profiles for which past activities have not been recorded yet. This way, new user profiles, which either are just previously added to the network or for which certain properties of the user profile had been modified, can be considered for the intrusion detection.

For this a Neural Network is trained on multiple sets of user profile data and activity data of multiple user profiles of the network or company, such that after training the neural network is capable of predicting future activities for at least some or all of the multiple user profiles for future dates.

Via the neural network trained on the multiple sets of activity data of the multiple user profiles a set of further user profile data of a further user profile, for which no previous activity data exists, can be analyzed and future activities for the further user profile can be predicted based on the multiple sets of activity data of the other user profiles of the network Each of the user profiles has an individual set of user profile data, in which multiple features, properties and information regarding the respective user profile is recorded.

If a further user profile, for which no activity data is available, is added to the network, the further user profile is provided with a set of further user profile data, which comprise multiple features, properties and information regarding the user profile that are configured to identify the further user profile within the network of multiple interconnected user profiles.

By applying the Neural Network to the set of further user profile data the trained Neural Network learns the features and properties of the further user profile.

Due to the training process and the learned properties and features of the further user profile the trained Neural network is capable of predicting future activities of the further user profile by taking into account the properties, features and information regarding the multiple user profiles listed in the sets of user profile data on which the Neural Network is trained and the respective features, properties and information regarding the further user profile listed in the set of further user profile data on which the trained neural network is applied.

In the next steps, on this predetermined future date, the activity of the further user profile is observed and the trained Neural Network is applied on the observed activity of the further user profile, according to one or more embodiments.

If in the next step it is detected by the trained Neural Network that the observed activity deviates from the predicted activity of the further user profile, a malicious activity of the further user profile is detected.

With this, in at least one embodiment, user profiles for which no activity data are available can be included into the detection of malicious activity within the network of multiple interconnected user profiles.

By the application of a Neural Network trained specifically on multiple sets of user profile data and activity data of multiple user profiles of the network the technical advantage of high accuracy of the prediction of activity data for the further user profile can be achieved, according to one or more embodiments.

In at least one embodiment of the invention, a user profile is a computerized profile that is generated to allow a certain user access to a computerized network of multiple computerized workplaces. Via the user profile, the respective user can execute a data communication with other user profiles, that is other users, of the network. A user profile can be assigned individually to a certain user. Alternatively, in one or more embodiments, a user profile can be assigned to a certain computerized workplace.

In application to a company or organization the user profile is a logon profile installed on a computer workplace via which an employee can access the intranet of the company or organization.

In at least one embodiment of the invention, a network is a network of multiple interconnected computerized workplaces. In at least one embodiment, a network can be a network, i.e. the intranet of computers of a company or a comparable organization. The employees can individually access the network via respective user profiles. The provides a data communication between the multiple computers of the network or access to data of internal databanks of the respective company or organization.

In the following, the terms user and user profile can be used synonymously. In the context of a company or organization, a user can be an employee of that company or organization.

In at least one embodiment of the invention, a set of user profile data is a set of information that is configured to identify the respective user profile within the network of interconnected user profiles. The set of user profile data comprises multiple features or properties that allow a detailed description of the respective user profile. User profile data can for example comprise a user name and password of the respective user profile, an affiliation of the respective user to a team, group or department of the company or organization, a telephone number, an e-mail address or other information that allows an identification of the user the respective profile is assigned to. Alternatively, in one or more embodiments, the user profile data can comprise an IP address of the computer or computerized workplace the respective user profile is assigned to. A user profile can be individually assigned to a particular user. Alternatively, in one or more embodiments, a user profile can be assigned to a particular computerized workplace.

In at least one embodiment of the invention, a set of activity data is a data set that comprises raw events of activity of a particular user profile. A set of activity data can comprise raw events of an audit log, in which the activity of a certain user profile is listed. Each set of activity data comprises the activity of a certain user profile for a given predetermined time span. An activity of a user profile can be a logon to the user profile, a sending or receiving of emails, a browsing of certain webpages, an access to certain databanks, a data communication with other user profiles, the generation or deletion of certain datafiles, or the execution of certain work processes.

In at least one embodiment of the invention, the wording "a further user profile for which no sets of activity data exist" comprises the case that previous activity data exist but are insufficient to predict future activities of that particular further user profile. This can in particular be the case, if a user or employee of the company or organization is affiliated to a different role, team, group or position, such that the activity data obtained for his or her previous role, team, group or position does not allow a prediction of future activities of the user or employee, i.e. further user profile, due to the stark differences in the previous role, team, group or position the user profile previously assigned to compared to the role, team, group or position the employee, user, i.e. further user profile, is currently assigned to.

In at least one embodiment of the invention, a malicious activity is an activity that deviates from an expected activity for a particular user profile. A malicious activity therefore can be any activity of a user profile that is uncommon and therefore unexpected for that particular user profile. A malicious activity can therefore be based on malicious activity of a certain employee suing this particular user profile, or based on a hacking attack to that particular user profile by an external entity not part of the network of interconnected user profiles.

According to at least one embodiment, the method further comprises:

Stopping all activities of the at least one user profile and and/or removing the at least one user profile from the network, if the malicious activity is detected for the further user profile.

This achieves the technical effect, that after detection of the malicious activities the security of the network can be maintained or re-established.

According to at least one embodiment of the invention, each set of user profile data of each user profile and the set of further user profile data of the further user profile comprise, respectively at least one of the following list comprising information regarding an identity of the respective user profile or further user profile, an affiliation of the respective user profile or further user profile to a certain team and/or group and/or department within the organization structure, a role of the respective user profile or further user profile within the organization structure, an affiliation to a project of the respective user profile or further user profile, relations to other user profiles or the further user profile, access permit to certain information and the like.

This achieves the technical advantage, that a clear identification of a user profile based on a respective set of user profile data can be achieved. Further, in one or more embodiments, based on the respective set of user profile data, every user profile can be classified into the organization structure of the network of interconnected user profiles. With the respective information from the set of user profile data, the respective user profile can be assigned to a certain team, group or department within the organization or company.

Further, in at least one embodiment, the respective user profile can be assigned to a certain supervisor or a certain role within the company or organization.

Further, in at least one embodiment, the respective user profile can be assigned to certain relations to other user profiles within the organization or company. This information allows a comparison between a different user profile in order to determine comparable activities of different user profiles. For example, for different user profiles which are assigned to identical teams, groups or departments comparable activities can be expected.

Further, in at least one embodiment, based on the roles or projects of the respective user profiles, common activities of the respective user profiles can be predicted. Therefore, based on the information of the respective user profile data user profiles can be classified within the organization structure of the company or organization, and based on the activities that are common for user profiles with a respective classification within the organization or company, activities can be predicted or user profiles with comparable classification.

According to at least one embodiment of the invention, the further user profile is a user profile additionally added to the network of computerized user profiles or a user profile of the network of computerized user profiles with a modified set of user profile data, wherein a modified set of user profile data comprises at least one modified information regarding the user profile.

This achieves the technical advantage that for the intrusion detection to detect malicious insider activities within the network of multiple interconnected computerized user profiles user profiles can be considered which are either new user profiles that just recently have been generated, or that are existing user profiles for which certain features or properties of the user profile data have been modified.

If a new user profile is generated, no activity data exists for the new user profile. This can be the case if a new employee joins the company or organization. Because of the missing previous activity data for the new user expected activities cannot be predicted accurately, as no basis for this prediction exists. Consequently, usually a new generated user profile cannot be considered for the intrusion detection.

With the method for intrusion detection according to one or more embodiments of the invention, newly generated user profiles can be considered for the intrusion detection by identifying already existing user profiles that are comparable to the newly generated user profile with regard to the respective user profile data and by predicting activities for the newly generated user profile based on the existing activity data of the user profiles identified as comparable to the newly generated user profile.

The same comparison can be executed for user profiles that have been modified with regard to at least one property or feature of the user profile. For example, a user profile can be modified with regard to a team or group or department the user profile is affiliated with. This could resemble the case where a certain user or employee of the company is transferred to another team, group or department.

Further, in at least one embodiment, a user profile could be modified by assigning a new role or a project to the respective user profile, which resembled the case where a certain user or employee of the company or organization is assigned to a new role or works on a new project.

Expected activity of the user profile with at least one modified property or feature can then be predicted based on the activity of existing user profiles with comparable features or properties. For example, in at least one embodiment, the activity of a user profile assigned to a new team can be predicted by the common activities of other user profiles of that particular team.

According to at least one embodiment of the invention, the sets of user profile data and the set of further user profile data are generated by using a graph representation of the respective user profile data and the further user profile data and by performing graph embedding transformations of the respective graph representations.

This achieves the technical advantage, that a clear representation of the user profile data via the graph representation can be provided.

Further, in one or more embodiments, by executing a graph embedding transformation, the graph representation of the user profile data can be transformed into respective vector representations which allows the sets of user profile data to be used as input to neural networks in order to provide reliable predictions of activities of the respective user profiles.

Via the graph representation of the user profile data, it can be achieved that user profiles that are positioned with close proximity within the organization structure of the network because of their comparable or identical affiliation to certain teams, groups, departments or projects or that are assigned to comparable or identical roles can be provided with graph representations of the respective user profile data that resemble the close proximity of the two user profiles within the organization structure by a comparable close proximity of their positioning within the respective vector space.

With this, a comparison between user profiles with great agreements in their respective features or properties can be achieved. This allows for an improved identification of comparable or identical user profiles.

This further allows for an improved prediction of respective activity, in particular for new or modified user profiles for which no activity data exist, according to one or more embodiments. Via the execution of graph representation and graph embedding transformation, the information of the user profile data can be used for the prediction of activity of certain user profiles for which activity data do not exist in the most efficient way.

Thus, via the execution of graph representation and of graph embedding transformation, the quality and reliability of the predicted activity for user profiles for which activity data do not exist can be enhanced. With this, the overall quality of the intrusion detection can be improved as user profiles for which no activity data exist can be included into the intrusion detection.

According to at least one embodiment of the invention, the predefined comparison criterion is a level of congruence of the graph representation of the respective sets of user profile data and the set of further user profile data.

This achieves the technical advantage, that a reliable comparison between different user profiles can be achieved. A high level of congruence between two graph representations of different sets of user profile data leads to a high degree of agreements of the features and the properties of the respective user profiles. Therefore, two user profiles with comparable features and properties that have graph representations of their user profile data with high congruence can be identified as comparable user profiles.

According to at least one embodiment of the invention, an individual neural network is assigned to each of the user profiles and the further user profile.

This achieves the technical advantage, that an improved prediction of expected activity for each of the user profiles can be achieved. By assigning individual neural networks to each of the user profiles, the respective neural networks can be trained more specific to the activity data of each of the user profiles. As a result, in one or more embodiments, the quality of the prediction of the expected activity for each of the user profiles can be enhanced. This further leads to an improvement of the accuracy of the final results of the method for intrusion detection. This leads to more reliability of intrusion detection.

According to at least one embodiment of the invention, the neural network performs Zero Shot Learning.

This achieves the technical advantage that the quality of the prediction of the expected activity of the further user profile for which no activity data exists can be enhanced. By performing Zero Shot Learning for at least the neural network assigned to the further user profile, the neural network is capable of predicting expected activity for the further user profile by taking into consideration the set of further user profile data of the further user profile and the multiple sets of activity data of the identified user profile with features and properties comparable to the features and properties of the further user profile.

The Zero Shot Learning method therefore allows for a precise and reliable prediction of expected activity for the further user profile and therefore for a consideration of user profiles for which no activity data exists in the intrusion detection to detect malicious insider threat activities; according to one or more embodiments of the invention.

According to at least one embodiment, the time span comprises 24 hours, and wherein the activity data comprises data from audit log files comprising activity information of the respective user profile or further user profile.

This achieves the technical advantage that the activity of the user profiles within the network of multiple interconnected user profiles can be monitored for a complete workday.

Further, in one or more embodiments, the consideration of audit logs in order to generate the sets of activity data provides an easy way of generating activity data with a high level of detail and accuracy.

According to at least one embodiment of the invention, a system for intrusion detection to detect malicious insider threat activities within a network of multiple interconnected computerized user profiles is provided, wherein the systems is electronically connectable to the network of interconnected user profiles, wherein the system comprises at least a processor unit, and wherein the system is configured to execute the method for intrusion detection to detect malicious insider threat activities within a network of multiple interconnected computerized user profiles.

This achieves the technical advantage, that a system can be provided that is configured to execute the method for intrusion detection to detect malicious insider threat activities within a network of multiple interconnected computerized user profiles of one or more embodiments of the invention.

BRIEF DESCRIPTION OF THE DRAWINGS

The above-described properties, features and advantages of the invention and the way in which they are achieved will become clearer and more clearly understood in association with the following description of one or more embodiments which are explained in greater detail in association with the drawings. Here in schematic illustration in each case.

DETAILED DESCRIPTION OF THE INVENTION

Figure 1:
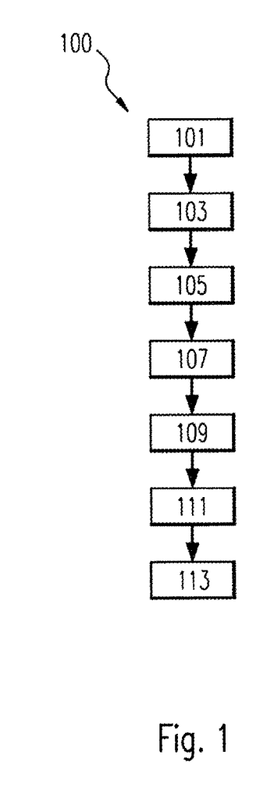
FIG. 1 shows a flow chart of a method for intrusion detection to detect malicious insider threat activities within a network of multiple interconnected computerized user profiles according to one or more embodiments of the invention.
Figure 2:
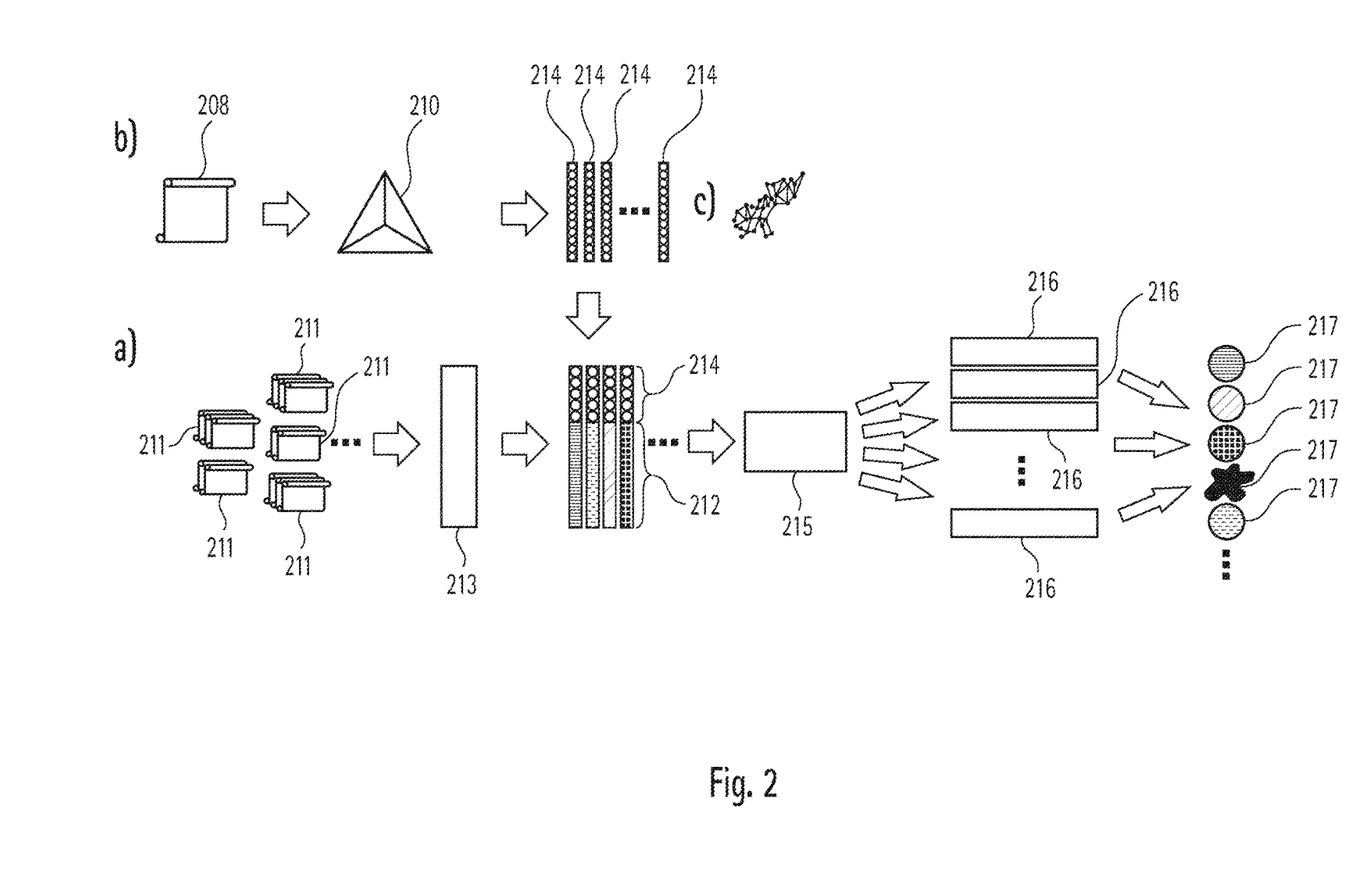
FIG. 2 shows a schematic overview of the method for intrusion detection to detect malicious insider threat activities within a network of multiple interconnected computerized user profiles according to one or more embodiments of the invention.
Figure 3:
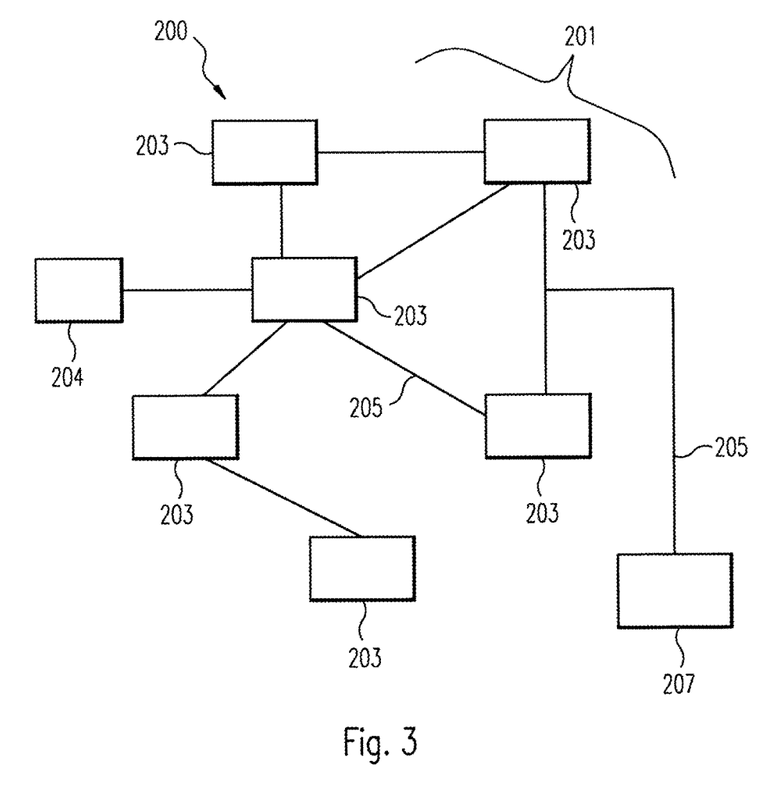
FIG. 3 shows a schematic drawing of a system for intrusion detection to detect malicious insider threat activities within a network of multiple interconnected computerized user profiles according to one or more embodiments of the invention.

The detailed description of FIG. 1 will be conducted with reference to FIG. 2 and FIG. 3 and the respective description.

FIG. 1 shows a flow chart of a method 100 for intrusion detection to detect malicious insider threat activities within a network 201 of multiple interconnected computerized user profiles 203 according to one or more embodiments of the invention.

According to at least one embodiment, as shown in FIG. 1, the method 100 for intrusion detection to detect malicious insider threat activities within a network 201 of multiple interconnected computerized user profiles 203 is applicable to a network 201 with user profiles 203, with each user profile 203 being defined by a set of user profile data 209, wherein the user profile data 209 of a user profile 203 are configured to identify the respective user profile 203 within an organization structure of the network 201 of the multiple interconnected user profiles 203, wherein for each user profile 203 multiple sets of activity data 211 are available, wherein each set of activity data 211 of a user profile 203 is configured to illustrate the activity of the user profile 203 for a particular date during a predefined time span, wherein the network 201 further comprises a further user profile 204, wherein the further user profile 204 is defined by a set of further user profile data, wherein the further user profile data of the further user profile 204 are configured to identify the further user profile 204 within the organization structure of the network 201 of the multiple interconnected user profiles 203, 204, and wherein for the further user profile (204) no sets of activity data 211 are available.

According to at least one embodiment, as shown in FIG. 1, the method 100 comprises the following method steps:

Training 101 a neural network 215, 216 on multiple sets of user profile data for multiple user profiles 203 and on multiple sets of activity data 211 of the multiple user profiles 203 of the network 201, such that the neural network 215, 216 is capable of predicting for future dates activities for multiple user profiles 203, Applying 103 the trained neural network 215, 216 to the set of further user profile data, Predicting 105 an activity of the further user profile 204 for a future date based on the multiple sets of activity data 211 by the trained neural network 215, 216, Observing 107 the activity of the further user profile 204 at the future date Applying 109 the trained neural network 215, 216 to the observed activity of the further user profile 204 at the future date with the predicted activity for the further user profile 204 at the future date, and Detecting 111 malicious activity for the further user profile 204 at the future date by the trained neural network 215, 216, if the observed activity of the further user profile 204 at the future date deviates from the predicted activity of the further user profile 204 for the future date.

A network 201 of multiple interconnected computerized user profiles 203 can for example be an intranet network of computerized workplaces within a company or organization that provides multiple users or employees access to databanks and allows for a data communication between users or employees of the company.

The user profiles 203 can be logon profiles installed on the computerized workplaces via which the users or employees can access the intranet of the company or organization.

The user profiles can be individually assigned to particular users or employees of the company and can for example be individualized via certain user names and passwords.

Computerized workplaces can be desktop computers, laptops, mobile devices, industrial computers, server or cloud entities or the like.

The user profiles 203 can be identified within the organization structure of the network 201 via individualized user profile data 209 that comprise significant information regarding the respective user profile 203. For example, in one or more embodiments, user profile data 209 can comprise individual information like user names or passwords or identity information regarding the respective user or employee.

User profile data can further include affiliations of the user profile, i.e. the respective user or employee, to certain teams, groups or departments within the organization or company and can further comprise information regarding the role of the respective user or employee within the organization structure or certain projects, the user or employee is affiliated to.

User profile data can comprise all kinds of information that allows an identification of the respective user profile and the corresponding user or employee within the organization structure of the company or organization.

For each of the user profiles 203 multiple sets of activity data 211 are available. The activity data 211 can comprise information regarding the activity of the respective user profile 203.

Recorded activity of respective user profiles 203 can comprise data regarding logon of a user or employee to the respective user profile. Activity data can further comprise data regarding emails that are send and/or received from a particular user profile. Activity data can further comprise data regarding browsing of web sites in the internet performed by the respective user profile. Activity data can further comprise data regarding usage of removable devices.

Activity data can further comprise the access to certain databanks and with this the access to certain information, the generation of certain data files, the interaction with other user profiles 203 of the network 201, the communication with individuals outside the network 201 as well as other information of interest for the activity of user profiles 203 within the network 201 of the organization or company.

Sets of activity data 211 can comprise activity events of the respective user profiles 203 for a predefined timespan. A predefined timespan can be 24 hours. Alternatively, in one or more embodiments, the predefined timespan can be any time period of interest, spanning from few hours to days, weeks, months or years.

The multiple sets of activity data 211 allow for a determination of a normal behavior of a certain user profile 203.

A normal behavior of a certain user profile, i.e. a respective employee, is a behavior that complies with the previous activity data of the multiple sets of activity data 211.

Via the multiple sets of activity data 211 and the respective normal behavior of the user profile 203, a normal activity for that particular user profile 203 can be predicted for a future date. This is achieved by the training of the neural network 215, 216 on the multiple sets of user profile data and the multiple sets of activity data 211 of the multiple user profiles 203. Due to the training, in one or more embodiments, the neural network 215, 216 is capable of predicting future activities for each of the multiple user profiles, wherein the predicted activity matches the previous activities of the multiple user profiles and therefore can be regarded as normal activity. The expected normal behavior corresponds to activity of that particular user profile 203, i.e. the respective employee, that complies with the previous activity of the multiple sets of activity data 211.

The future date for example can be the following workday. Alternatively, in one or more embodiments, the future date can be any future time period of interest.

A further user profile 204 is a user profile of the network 201 for which no activity data 211 exists. For example, a further user profile 204 can be a new user profile that was added to the network 201 just recently and therefore no activity data could be recorded. This new user profile could for example resemble a new employee of the organization or company that just previously joined the company.

In at least one embodiment, the further user profile 204 can be a user profile that has already been a member of the network 201, for which however certain properties or features of the respective further user profile data had been modified. This could for example resemble an employee of the company or organization that was transferred to another team, group or department or that was affiliated to a different project or role. Since the activity of a certain user profile strongly correlates with its affiliation to certain teams, groups, departments or projects and roles within the organization or company, an affiliation to a different team, group, department, project or role can lead to prominent differences in activity, such that the activities previously recorded for that particular user are insufficient for a reliable prediction of future activities of the user profile affiliated to a different team, group, department, project or role.

In a first method step 101, the neural network 215, 216 is trained on multiple sets of user profile data and multiple sets of activity data of multiple user profiles 203 of the network 201. For this, in at least one embodiment, the multiple sets of user profile data and activity data is fed to the neural network 215, 216 and the Network is trained until it is capable of predicting future activities for the multiple user profiles 203 for future dates. The predictions are based on the multiple sets of user profile data and activity data used for the training of the neural network 215, 216 and the predicted activities therefore correspond to some degree to the previous activities of the respected user profiles 203 listed in the multiple sets of activity data. Thus, the predicted activities for a particular user profile 203 can be regarded as normal activity of that user profile 203.

During the training of the neural network 215, 216 in step 101, in at least one embodiment, different features and properties of the respective user profiles 203 that are recorded in the sets of user profile data 209 are considered and incorporated into the neural network 215, 216.

These features and properties can for example comprise the affiliations of the respective user profiles 203 to certain teams, groups, departments, projects and roles within the organization or company.

In the following step 103, according to at least one embodiment, the trained neural network 215, 216 is applied to the set of further user profile data of the further ser profile 204, in order for the neural network 215, 216 to learn the properties and features of the further user profile data.

These features and properties of the further user profile 204 can for example comprise the affiliations of the respective user profiles 203 to certain teams, groups, departments, projects and roles within the organization or company.

Through the training on the user profile data and the activity data of the user profiles 203 and through the consideration of the set of further user profile data of the further user profile 204 the trained neural network 215, 216 has learned several features of the network 201 and the relations between user profiles 203 as well as certain activities of the respective user profiles 203, for example that user profiles that are affiliated to identical teams, groups, departments, projects or roles in normal situations exhibit comparable activities.

User profiles with identical roles within the organization or company can therefore be regarded as comparable user profiles. The role of a user or employee within the company or organization can be a telling property for a prediction of expected activities. For example, in at least one embodiment, accountants in a company or organization usually have comparable activities, even if they are affiliated to different projects or teams.

Alternatively, in one or more embodiments, user profiles affiliated to identical teams or departments, can be regarded as comparable user profiles, as members of identical teams or departments most likely will show comparable or identical activities.

In at least one embodiment, the user profile data 211 of the user profiles 203 and the further user profile data of the further user profile 204 can be represented in a graph representation. In this graph representation, each of the nodes can be assigned to certain features or properties of the respective user profiles.

Further, in one or more embodiments, each of the graphs can include other user profiles and therefore resemble the organization structure of the network 201. Edges between the nodes of the graph representation can therefore resemble relations between different user profiles within the organization structure.

In at least one embodiment, a high level of congruence between different graph representations of the user profile data of the respective user profiles can be interpreted as a high level of similarity between the properties and features of the respective user profiles. In this context, congruence is to be understood in its mathematical sense, meaning that two entities with high level of congruence possess similar geometrical properties.

The application of the neural network 215, 216 on the set of further user data in step 103 was performed in order for the neural network 215, 216 to learn the properties and features of the further user profile 204, such that the trained neural network 215, 216 is capable of predicting future activity for the further user profile 204 based on the activity that the neural network 215, 216 has learned during the training process is normal for user profiles that are comparable to the further user profile 204 with regard to their features and properties.

Thus, in one or more embodiments, after training the neural network 215, 216 on the properties and features of the further user profile 204, in the following method step 105 an activity of the further user profile 203 for a future date is predicted by the trained neural network 215, 216 based on the multiple sets of user profile data and the multiple sets of activity data 211 of multiple user profiles 203 the neural network 215, 216 was trained on and based on the features and properties of the further user profile 204 listed in the set of further user profile data.

The future date can for example be the next working day. Thus, in at least one embodiment, based on the previous activities of the employee affiliated to the same team project and role as the new employee can be used for a prediction of the further activity of the new employee.

The prediction of the expected activity of the further user profile 204 is performed in a way, that the predicted activity complies with the previous activity recorded in the selected multiple sets of activity data of the identified user profile.

In the following step 107, in at least one embodiment, the activity of the further user profile 204 at the future date is observed and recorded. This can include an observation and recording of the activity of the new employee on the following workday.

After the recording of the activity of the further user profile 204, in the following method step 109, the trained neural network 215, 216 is applied to the observed activity of the further user profile 204, as the observed activity of the further user profile 204 is fed to the trained neural network 215, 216 as input data.

In the following step 111, a malicious activity of the further user profile 204 is detected if the observed activity of the further user profile 204 deviates from the predicted activity. This can include the case that at the following workday the new employee in fact shows a different activity pattern that according to some predetermined criteria deviates from the predicted activity based on the multiple sets of activity data 211 of the identified employee that for example is affiliated to the same team and project and has a comparable role within the company or organization.

According to at least one embodiment, shown in FIG. 1, the method 100 further comprises the method step:

Stopping 113 all activities of the further user profile 204 and/or removing the further user profile 204 from the network 201, if the malicious activity is detected for the further user profile 204.

After the detection of the malicious activity, in the following step 113, all activities of the further user profile 204 are stopped and/or the further user profile 204 is removed from the network 201. This can include shutting down the respective user profile of the new employee and if necessary, removing the new employee from the company.

According to at least one embodiment of method 100, the neural network 215, 216 can execute a Zero Shot Learning method in order to predict the expected activity of the further user profile 204, i.e. the employee just recently joining the company or organization or just recently being affiliated to another team, group, project or role.

For the Zero Shot Learning method, the neural network 215, 216 can take into account the multiple sets of activity data 211 of a previously identified user profile 203 with comparable or identical features and properties and the features and properties recorded in the further user profile data of the further user profile 204 in order to predict an activity of the further user profile 204 for a future date, without being trained on the previous activity of the further user profile 204.

Via the application of the Zero Shot Learning method, an activity of a new employee for which no previous activity is recorded, for a future date, for example a future workday, can be predicted by taking into consideration the multiple features and properties that are assigned to that particular new employee, for example the specific role that the new employee has in the company or organization, the team the employee is assigned to or the project the employee is working in.

In this case, according to one or more embodiments, the respective further user profile data will be regarded as additional semantic information regarding the further user profile 204, i.e. the new employee of the organization or company. The selected multiple sets of activity data 211 of the identified user profile 203 will be regarded as input data used for training the neural network 215, 216 in order to predict expected activities of the employees of the company or organization.

FIG. 2 shows a schematic overview of the method for intrusion detection to detect malicious insider threat activities within a network of multiple interconnected computerized user profiles according to one or more embodiments of the invention.

The sections a) and b) in FIG. 2 illustrate different aspects of method 100 according to at least one embodiment of the invention. The different actions illustrated in sections a) and b) can be conducted individually and independent from each other. The succession of the following description of sections a) and b) does not indicate that the respective actions in sections a) and b) must be conducting in this particular order.

In section a) multiple sets of activity data 211 are transformed in a vector representation. For this, multiple sets of raw events of activity data 211 that are extracted from user logs or audit logs configured to record the activity of the employee of the organization or company are assembled. The recorded activities, i.e. the raw events of the audit logs, are assigned to a particular user profile 203. The user profile 203 can be assigned to a particular computerized workplace or to a particular user or employee of the company or organization. The raw events from the audit logs are organized in multiple sets, wherein each set comprises the activities for a predefined timespan. The timespan can be for example a workday or 24 hours.

The raw activity events can comprise logon events to a particular user profile, sent and/or received emails from a particular user profile, web browsing events including access to webpages by a user profile, access to internal data banks, usage of removable drives, creation and/or deletion of datafiles and other activities of user profiles within the internal network of the company.

Via a feature extraction algorithm 213, in one or more embodiments, each of the multiple sets of activity data 211 are transformed into a low dimensional vector representation 212. Thus, for each set of activity data 211, one individual vector representation 212 is generated. In particular, one vector per user profile per day can be generated.

Alternatively, in one or more embodiments, the predefined time span can be a different value than one day. For example, in at least one embodiment, the predefined time span can be a work day, i.e. 8 hours. Alternatively, in one or more embodiments, the predefined time span can be an arbitrary time period over which the activity data for a given user profile are recorded and summarized into one set of activity data and then output in one feature vector. Each of the vector representations 212 represents one set of activity data 211 for that particular user profile.

In section b) a graph representation and graph embedding of user profile data is illustrated. For this, a set of user profile attributes 208 is transformed into a graph representation 210. The user profile attributes 208 comprise the features and properties of the user profile.

In the graph representation 210, each of the nodes is assigned to either a feature or property of the respective user profile 203 recorded in the profile attributes 208 or to other user profiles 203 of the organization structure. The edges of the graph representation 210 represent certain relations between different user profiles 203 or illustrate certain assignments to teams, groups, projects or roles of the respective user profile representing a user or employee of the company or organization.

A graph representation of the user profile data 209 can be constructed in different ways. Graphs can be built from nodes and edges directly in a symbolic form, where each node can be assigned to one feature of the respective user profile 203 whereas edges can be assigned to certain links and relations of the respective user profile.

Graphs can further comprise built-in curated collections of theoretical or empirical graphs. In particular, in at least one embodiment, a graph can be grown in either by adding one edge at a time or one node at a time. The sets of user profile attributes 208 can further be accompanied by LDAP attributes and mainly be composed of information that define relationships of a user with different entities, i.e. different user profiles within the organization structure.

In order to analyze graph data, several graph embedding techniques known from state of the art can be applied to the graph representations 210. The feature representations are mostly known to preserve the structural information of graphs, and thus can be used as features in building machine learning models.

In the next step, in at least one embodiment, the graph representation 210 is transformed via a graph embedding transformation into multiple vector representations of the user profile data 214. The embedding maps each node of the graph representation 201 to a low dimensional vector representation 214 and tries to preserve the connection strengths between the nodes.

With the vector representation of the user profile data 214 all information of the user profile attributes 208 and the graph representation 210 of the user profile attributes 208 is transformed into a set of multiple low-dimensional vectors.

In section c) an example of a graphical representation of the embeddings of the vector representations of the user profile data 209 of an organization structure in the respective vector space is shown, according to one or more embodiments. The graphical representation in section c) is merely for illustrative purposes.

After the graph representation and the generation of the set of multiple low-dimensional vector representation of the user profile data 214, a set of multiple vectors of the user profile data 214 is combined with the set of multiple vector representations of the activity data 212. With this, a set of multiple low-dimensional vectors 214 is generated based on the multiple sets of raw events of activity data 211 and the information regarding the features and properties of the user profile 203 recorded in the user profile attributes 208 and the set of user profile data 209, respectively.

After the generation of the set of multiple low-dimensional vector representations 212 combined with the multiple vector representation of the user profile data 214, this set of low-dimensional vector representations 212, 214 is input into a neural network 215. In at least one embodiment, as shown in FIG. 2, the neural network 215 is realized via multiple individual neural networks 216, wherein each neural network is assigned to one particular user profile 203 and therefore is configured to predict an activity for that particular user profile 203.

Each of the neural networks 216 is assigned to one particular user or user profile and is configured to learn to model the normal behavior of each user profile 203 based on the activity data 211 of each user profile 203. The neural networks are further tasked and configured to predict the next vector in the sequence, i.e. the most likely activity of the respective user profile for the next day.

Based on the activity predicted by the neural networks 216 for each of the user profiles 203 for a given future date and the actual activity observed for each of the user profiles 203 for that particular future date, by way of one or more embodiments, a certain anomaly score 217 is generated by the neural networks 216. The anomaly score 217 gives a number value that describes the objective deviation between the predicted activity and the actually observed activity for each of the user profiles 203. Based on the anomaly scores 217, malicious activities can be identified.

To include a new user or employee of the organization or company into the intrusion detection, a graph embedding according to the method illustrated in section b) of user profile attributes 208 of the new user or employee is computed and respective vector representations of the user profile attributes 214 are generated, according to one or more embodiments.

Further, a vector representation of activity data 212 of a user profile 203 identified as comparable to the further user profile 204 of the new user or employee is generated.

The generated vector representation of the user profile attributes 214 of the new user or employee are then combined with the vector representation of the sets of activity data 212 of the user profile 203. The generated set of vector representations 212, 214 for the new user or employee is then fed into the respective neural network 215, 216 to provide a prediction of activity of that new user or employee for a future date.

Based on this prediction, in at least one embodiment, a respective anomaly score 217 is generated by the respective neural network 215, 216 in order to identify malicious activities.

The method 100 of the current invention is applicable to different networks of interconnected user profiles. These networks can be networks of interconnected computerized workplaces of an internal network of a company or organization, but are not limited thereto.

FIG. 3 shows a schematic drawing of a system for intrusion detection to detect malicious insider threat activities within a network of multiple interconnected computerized user profiles according to one or more embodiments of the invention.

The system 200 comprises a processor unit 207. The processor unit 207 is connected to a network 201 of multiple interconnected user profiles 203. The user profiles 203 are connected via a data connection 205 configured to conduct data transfer and data communication between the multiple user profiles 203.

The multiple user profiles 203 can be assigned to individual computerized workplaces. Alternatively, in one or more embodiments, the multiple user profiles 203 can be organized on a computer server unit. The network 201 can be a network of different computerized workplaces of a company or any comparable organization.

The processor unit 207 is connected to the network 201 via the data connection 205 and is configured to execute the method 100.

The illustration of the network 201 and the multiple user profiles 203 in FIG. 3 is merely for illustrative purpose. Modifications of the network 201, the multiple user profiles 203, in particular the organization of the network 201 including the interconnection of the multiple user profiles 203 as well as the number of user profiles 203, are covered by the scope of the current invention, by way of one or more embodiments.

LIST OF REFERENCE SIGNS

100 method for intrusion detection to detect malicious insider threat activities within a network of multiple interconnected computerized user profiles
101 training of neural network
103 applying neural network to further user profile
105 predicting activity of further user profile
107 observing activity of further user profile
109 applying neural network to observed activity
111 detecting malicious activity
113 stopping activity and/or removing further user profile from network
200 system for intrusion detection to detect malicious insider threat activities within a network of multiple interconnected computerized user profiles
201 network
203 user profile
204 further user profile
205 data connection
207 processor unit
208 user profile attributes
209 set of user profile data
210 graph representation
211 activity data
212 vector representation
213 feature extraction algorithm
214 vector representation
215 neural network
216 neural network
217 anomality score

The invention claimed is:

1. A method for intrusion detection to detect malicious insider threat activities within a network comprising multiple interconnected computerized user profiles, wherein each user profile of the multiple interconnected computerized user profiles is defined by a set of user profile data, wherein the set of user profile data of a user profile are configured to identify a respective user profile within an organization structure of the network of the multiple interconnected computerized user profiles, wherein for said each user profile, multiple sets of activity data are available, wherein each set of activity data of the multiple sets of activity data of the user profile is configured to illustrate an activity of the user profile for a particular date during a predefined time span, wherein the network further comprises a further user profile, wherein the further user profile is defined by a set of further user profile data, wherein the set of further user profile data of the further user profile are configured to identify the further user profile within the organization structure of the network of the multiple interconnected computerized user profiles, and wherein for the further user profile no sets of activity data are available, the method comprising:

training a neural network, as a trained neural network, on multiple sets of user profile data for multiple user profiles of said multiple interconnected computerized user profiles and on the multiple sets of activity data of the multiple user profiles of the network, such that the neural network is capable of predicting for future dates activities for said multiple user profiles, applying the trained neural network on the set of further user profile data of the further user profile, predicting an activity of the further user profile for a future date based on the multiple sets of activity data by the trained neural network, observing the activity of the further user profile at the future date, applying the trained neural network on the activity of the further user profile that is observed at the future date, and detecting malicious activity for the further user profile at the future date by the trained neural network, if the activity of the further user profile that is observed at the future date deviates from the activity of the further user profile that is predicted for the future date.

2. The method according to claim 1, further comprising: stopping all activities of the further user profile and/or removing the further user profile from the network, if the malicious activity is detected for the further user profile.

3. The method according to claim 1, wherein each set of user profile data of said each user profile and the set of further user profile data of the further user profile comprise, respectively at least one of information regarding an identity of the respective user profile or said further user profile, an affiliation of the respective user profile or said further user profile to a certain team and/or group and/or department within the organization structure, a role of the respective user profile or said further user profile within the organization structure, an affiliation to a project of the respective user profile or said further user profile, relations to other user profiles or the further user profile, and access permit to certain information.

4. The method according to claim 1, wherein the further user profile is a user profile additionally added to the network of the multiple interconnected computerized user profiles or a user profile of the network of the multiple interconnected computerized user profiles with a modified set of user profile data, wherein the modified set of user profile data comprises at least one modified information regarding the user profile.

5. The method according to claim 1, wherein the set of user profile data and the set of further user profile data are generated by using a graph representation of the set of user profile data and the set of further user profile data and by performing graph embedding transformations of respective graph representations.

6. The method according to claim 5, wherein the graph embedding transformations comprises a predefined comparison criterion which is a level of congruence of the graph representation of respective sets of user profile data and the set of further user profile data.

7. The method according to claim 1, wherein an individual neural network is assigned to each of the multiple interconnected computerized user profiles and the further user profile.

8. The method according to claim 7, wherein the individual neural network performs Zero Shot Learning.

9. The method according to claim 1, wherein the predefined time span comprises 24 hours, and wherein the each set of activity data comprises data from audit log files comprising activity information of the respective user profile or the further user profile.

10. The method according to claim 1, wherein the predefined time span comprises 24 hours, and wherein the each set of activity data comprises data from audit log files comprising activity information of the respective user profile or the further user profile.

11. A system for intrusion detection to detect malicious insider threat activities within a network of multiple interconnected computerized user profiles, wherein the system is electronically connectable to the network of interconnected user profiles, wherein the system comprises:

at least a processor, and wherein the processor is configured to execute a method for intrusion detection to detect said malicious insider threat activities within the network of said multiple interconnected computerized user profiles, wherein each user profile of the multiple interconnected computerized user profiles is defined by a set of user profile data, wherein the set of user profile data of a user profile are configured to identify a respective user profile within an organization structure of the network of the multiple interconnected computerized user profiles, wherein for said each user profile, multiple sets of activity data are available, wherein each set of activity data of the multiple sets of activity data of the user profile is configured to illustrate an activity of the user profile for a particular data during a predefined time span, wherein the network further comprises a further user profile, wherein the further user profile is defined by a set of further user profile data, wherein the set of further user profile data of the further user profile are configure to identify the further user profile within the organization structure of the network of the multiple interconnected computerized user profiles, and wherein for the further user profile no sets of activity data are available, wherein the method comprises training a neural network, as a trained neural network, on multiple sets of user profile data for multiple user profiles of said multiple interconnected computerized user profiles and on the multiple sets of activity data of the multiple user profiles of the network, such that the neural network is capable of predicting for future dates activities for said multiple user profiles, applying the trained neural network on the set of further user profile data of the further user profile, predicting an activity of the further user profile for a future data based on the multiple sets of activity data by the trained neural network, observing the activity of the further user profile at the future data, applying the trained neural network on the activity of the further user profile that is observed at the future date, and detecting malicious activity for the further user profile at the future date by the trained neural network, if the activity of the further user profile that is observed at the future date deviates from the activity of the further user profile that is predicted for the future date.

* * * * *